Aug. 11, 1925.
A. F. YEATON
1,549,703
DERRICK FITTING
Filed July 28, 1923
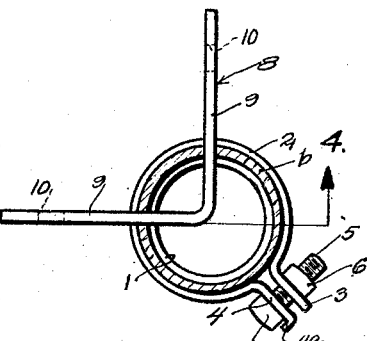
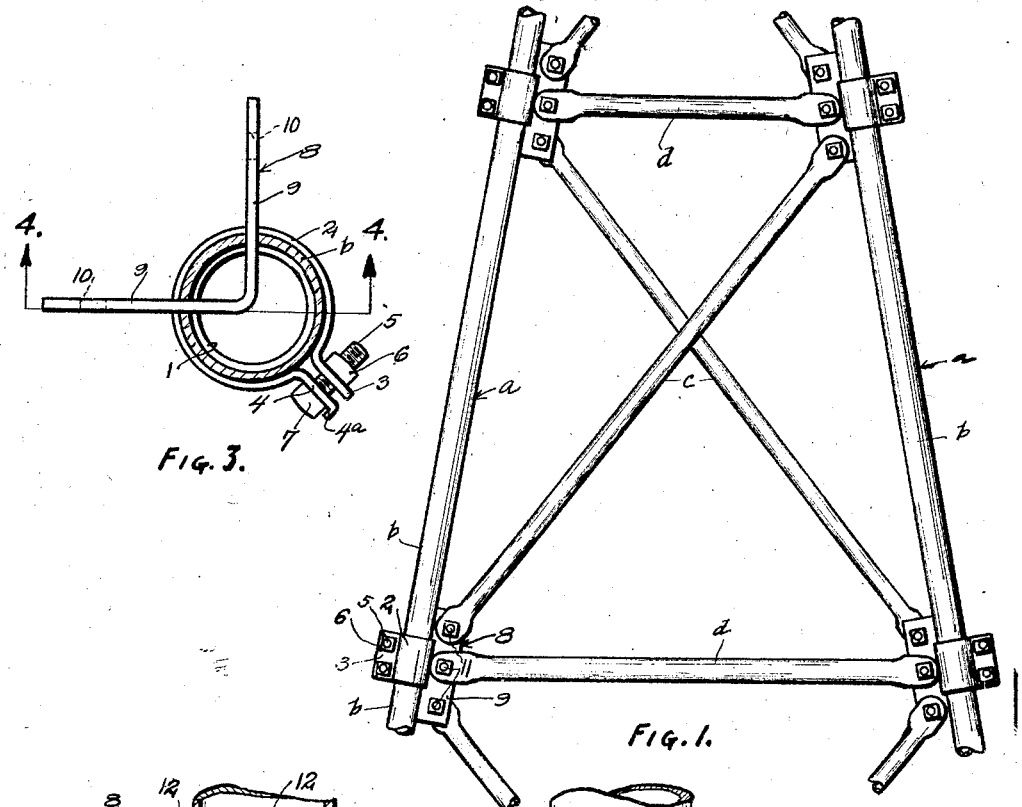
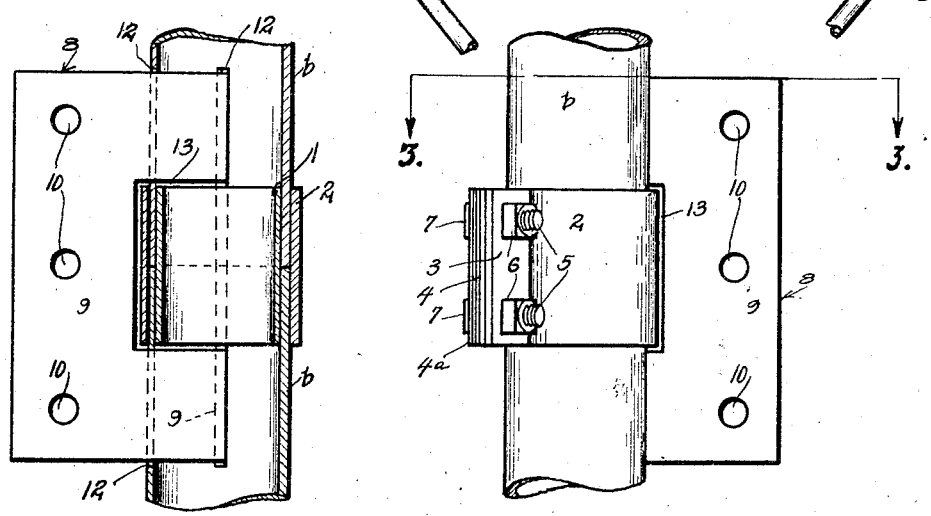
ALTON F. YEATON INVENTOR
BY *Victor J. Evans*
ATTORNEY Patented Aug. 11, 1925.

1,549,703

UNITED STATES PATENT OFFICE.

ALTON F. YEATON, OF AKRON, OHIO.

DERRICK FITTING.

Application filed July 28, 1923. Serial No. 654,412.

*To all whom it may concern:*

Be it known that I, ALTON F. YEATON, a citizen of the United States, residing at Akron, in the county of Summit and State of Ohio, have invented new and useful Improvements in Derrick Fittings, of which the following is a specification.

This invention relates to derrick fittings, and more particularly to a fitting for securing girts and braces to the legs of the derrick.

One of the main objects of the invention is to provide a fitting of simple construction which may be readily produced at small cost and may be quickly and easily secured in position. A further object is to provide a fitting which is particularly adapted to be secured by the abutting end portions of tubular sections used in constructing the uprights or legs of the derrick. Another object is to provide a device which, when in position, is so disposed as to permit the girts and braces to be readily secured thereto. Further objects will appear from the detail description.

In the drawings:—

Fig. 1 is a fragmentary side view of a derrick showing the device as applied;

Fig. 2 is a side view of the device as applied;

Fig. 3 is a section taken substantially on line 3—3 of Fig. 2;

Fig. 4 is a section taken substantially on line 4—4 of Fig. 3.

In constructing the derrick it is the common practice to form the posts or legs $a$ of tubular sections $b$ which are placed end to end, the abutting ends being secured together by any suitable or preferred means, and the sections being connected by cross braces $c$ and girts $d$. For securing the sections $b$ together, I prefer to employ a short sleeve or thimble 1 which fits within the adjacent ends of tubular sections $b$ and a clamp 2 which fits snugly about the adjacent ends of sections $b$, this clamp being provided with angularly disposed flanges 3 and 4 provided with aligned openings for reception of a bolt 5 upon which is threaded a nut 6. This bolt is provided with a squared head 7 and flange 4 is turned outwardly to provide a shoulder $4^a$ which serves to prevent turning of bolt 5 thus facilitating threading of the nut onto the bolt for securing the clamp tightly in position. This provides very simple and efficient means whereby the abutting ends of sections $b$ are secured together and effectually held in alignment and against relative movement.

For securing the girts and braces I provide a plate 8 which includes two arms 9 disposed at right angles to each other, each of these arms being provided with three openings 10 disposed for reception of bolts 11, which bolts also pass through the flattened end portions of the girts and braces for securing the same to plates 8. To accommodate plate 8 and anchor it in position, each of the sections $b$ is provided in its end portion with longitudinally extending slots 12, the slots of each section being disposed 90° apart and the slots of the two sections being in alignment. These slots receive the inner portions of arms 9 and serve to effectually anchor plate 8 in leg $a$. The central portion of plate 8 is cut away to provide an opening 13 which accommodates clamp 2 and thimble 1. As the clamp and thimble are positioned within this opening the plate acts to hold these members against movement longitudinally of sections $b$. The plate 8 also provides supplemental means for holding sections $b$ in alignment and for reinforcing and bracing these sections at the ends thereof. I have illustrated and described plate 8 as used for a four-legged derrick, the arms 9 being disposed at right angles to each other. The angle between the arms will vary in accordance with the particular type of derrick in connection with which the device is to be used. In example, when the device is to be used in connection with a six-legged derrick the arms 9 of plate 8 will be disposed at an angle of 60° to each other.

The device constructed in the manner illustrated and described may be quickly and easily applied and provides very simple and efficient means for securing the girts and braces to the legs of the derrick while also acting to effectually brace and secure together the adjacent ends of the tubular sections of which the legs of the derrick are formed. As indicated herein, and as will be understood, variations in details of construction and arrangement of parts of the invention may be resorted to without departing from the field and scope of the same, and I intend to include all such variations, as fall within the scope of the appended claims, in this application in which the preferred form only of my invention is disclosed.

What I claim is:—

1. In a device of the character described, in combination with two tubular sections arranged end to end, a plate secured through the adjacent end portions of said sections and including arms disposed in angular relation and adapted to receive means for securing bracing members to said arms, and means for securing said sections in alignment.

2. In a device of the character described, two tubular sections disposed end to end and provided with aligned slots extending from the ends of said sections, and a plate including arms disposed in angular relation and fitting into said slots, said arms being adapted for reception of securing means for securing brace members to the arms of the plate.

3. In combination with two tubular sections arranged end to end, each of said sections being provided with two slots extending longitudinally of the section from the end thereof, a plate including two arms disposed in angular relation and fitting into said slots, said arms being adapted for reception of securing means for securing brace members to the arms of said plate.

4. In combination with two tubular sections arranged end to end, each of said sections being provided with two slots extending longitudinally of the section from the end thereof, a plate including two arms disposed in angular relation and fitting into said slots, said arms being adapted for reception of securing means for securing brace members to the arms of said plate, and means supplemental to the plate for securing the ends of the tubular sections in alignment and holding said sections against relative movement.

5. In combination with two members arranged end to end and each provided with two longitudinally disposed slots extending from the end of said member, a plate including two angularly disposed arms fitting into said slots and each adapted for reception of securing means for securing brace members to the arms of said plate, and a clamp secured about the adjacent end portions of said members and acting to hold the same in alignment and against relative movement, said plate being cut away to provide an opening for accommodating the clamp.

6. In combination with two tubular sections disposed end to end and each provided with two longitudinally disposed slots extending from the end of said section, a plate including two arms disposed in angular relation and fitting into said slots, the central portion of said plate being cut away to provide an opening, a member fitting snugly within the adjacent end portions of said sections, and a clamp secured about the adjacent end portions of the sections, said member and the clamp co-acting to hold said sections in alignment and against relative movement, the opening in the central portion of the plate accommodating the clamp and said member and serving to hold the same against movement longitudinally of said sections.

7. In combination with two members disposed end to end and each provided with two longitudinally disposed slots extending from the end thereof, a plate including two arms disposed in angular relation and fitting into said slots, and a clamp secured about the end portions of said members, said plate having its central portion cut away to accommodate the clamp and acting to hold said clamp against movement longitudinally of said members.

8. As an article of manufacture, a plate bent to form two arms disposed in angular relation and adapted for reception of securing members for securing brace members to said arms, the central portion of the plate being cut away at the angle between the arms to provide an opening for accommodating a clamping device.

In testimony whereof I affix my signature.

ALTON F. YEATON.